Dec. 22, 1942. W. A. ROTH 2,306,363
HYDRAULIC CLUTCH
Filed Oct. 18, 1940
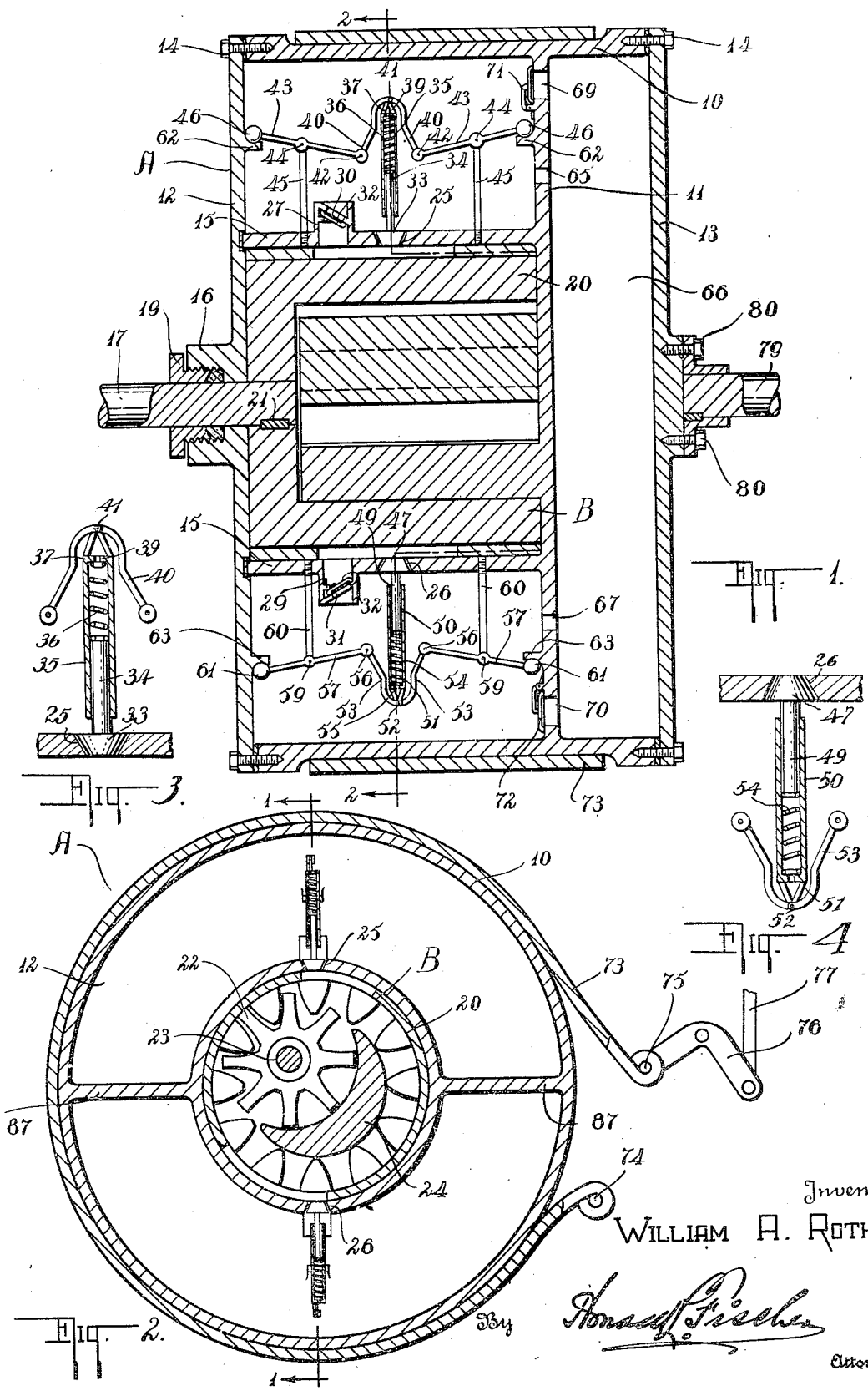
Inventor
WILLIAM A. ROTH
By Honsell Fischer
Attorney Patented Dec. 22, 1942

2,306,363

UNITED STATES PATENT OFFICE 2,306,363

HYDRAULIC CLUTCH

William A. Roth, St. Paul, Minn.

Application October 18, 1940, Serial No. 361,703

5 Claims. (Cl. 192—61)

My invention relates to a new and improved hydraulic clutch wherein it is desired to provide a more practical and efficient form of hydraulic clutch.

It is a primary object of my invention to provide a rotary type fluid pump in combination with other elements including a governing device which shall maintain a pressure opposed to a fluid pressure developed by the pump. This governing device operates to develop a pressure somewhat greater than the minimum pressure at any given engine speed, but somewhat less than the maximum pressure at this speed. These minimum and maximum pressures are proportional to the minimum and maximum torque capable of being developed by the engine or other suitable source of motor power at all speeds from idling speed to the speed where the greatest maximum torque may be developed.

It will be understood that at any engine speed, the maximum torque which the source of power is capable of developing is instantly made available when necessary. For example, an automobile travelling at a predetermined rate of speed and desiring to pass another vehicle may suddenly require greater than ordinary acceleration. The maximum torque the engine is capable of developing may thus be made available. My governor device is so arranged that where minimum torque is required for a predetermined speed, the valve will remain closed, but if unusual torque is required, such torque is rendered instantly available.

It is a feature of my invention that my clutch is of a type which permits quick and ready reversibility. This construction makes by device particularly attractive for use in certain fields. When in use upon a boat or ship, it enables the ship to be quickly and readily maneuvered, thus enabling a warship, for example, to turn and reverse more quickly than would otherwise be possible. The reversibility of my clutch when used with a suitable reversing gear is such as to prevent the creation of stress which may readily damage the power plants of the boat, vehicle, or plane in which it is located when full power is thrown in reverse. The reversible feature of my clutch is useful on other powered objects such as airplanes, for the speed of a plane might be quickly checked by reversing the direction of rotation of a propeller, thus permitting the plane to land in an extremely short runway and to aid materially in the maneuverability of the plane so equipped. Up to the present time planes have depended for the most part upon change of direction to avoid anti-aircraft fire and attacks from other planes. With my quickly reversible clutch, a change of speed may form as important a maneuver to avoid destruction as a change of direction.

My clutch is particularly adapted for use on locomotives or the like in sections where the use of electrical current is common. By using an electrical motor for operating my fluid clutch, which in turn may drive the locomotive through a power device such as that disclosed in my copending application, Serial No. 307,104, an alternating current power supply may be used. Thus by this means the direct current electrification systems which are extremely costly to construct and maintain may be eliminated and alternating current supply sources used in place thereof.

It is a further feature of my invention that my device may be used in combination with Diesel engines to drive Diesel locomotives and the like. With my device, the engine may be driven at a speed where it will develop sufficient torque to start a train and when used in combination with some mechanical gear shift arrangement or device such as I have illustrated in my aforementioned copending application, a heavy train may be started into motion and driven effectively at any desired speed.

This application is a continuation in part of my copending application, Serial No. 307,104, filed December 1, 1939, for "Automatic hydraulic transmission."

These and other objects and novel features of my invention will be more clearly and fully set forth in the following specification and claims.

In the drawing forming a part of my specification:

Figure 1 is a cross-sectional view through my clutch device.

Figure 2 is a cross-sectional view, the position of the section being indicated by the line 2—2 of Figure 1.

Figure 3 is an enlarged cross-sectional view of a passage valve opening illustrated in Figure 1.

Figure 4 is an enlarged cross-sectional view of a second valve passage also shown in Figure 1.

The present invention embodies a rotary pump which may be of the reversible type and which is used in combustion with a novel type of governor. This governor which will be later described in detail has the function of supporting the valve associated therewith operable in closed position when minimum torque is required and in open position when maximum torque is required at any engine speed.

In designing the device it is necessary to compute the pressure developed by the pump in any engine speed both when a minimum of torque is required and also when a maximum of torque at a certain engine speed is required. This torque requirement may be considerably different while the engine speed remains the same, as while travelling at a certain rate of speed, the torque load can be greatly increased by depressing the accelerator suddenly in order to accelerate the vehicle. When this action takes place, the speed of the motor does not immediately increase, but the torque load upon the same does. Thus at each speed of rotation, a minimum and maximum torque requirement may be plotted.

If the pressure developed by the pump actuated by the motor is plotted against the speed of the motor, two spaced curves will be attained, one of which represents the minimum pressure corresponding to the minimum torque, while the other curve represents the maximum pressure corresponding to the maximum torque requirement. It is desired that the governor be so constructed that it will at any speed maintain a pressure valve leading to the pump closed when a minimum torque is required at any speed, and to permit the valve to open when a maximum torque at any speed is required. This I have accomplished and the governor controlled valve will open between the maximum and minimum pressures developed.

The clutch A comprises a substantially hollow cylindrical outer shell 10 having a partition wall 11 between the ends thereof. An end closure 12 closes one end of the shell 10, while a closure 13 closes the other end of this shell. The closures 12 and 13 are held in place by bolts 14 or by any other suitable means.

A cylindrical sleeve 15 projects outwardly from the partition 11 into engagement with the closure wall 12 to form a seal therebetween. Thus a pair of shells or sleeves 10 and 15 which are concentric in their relationship are provided. A boss 16 is provided on the closure 12, and a drive shaft 17 extends through a packing joint 19 between the shaft 17 and the boss 16. The outer rotor 20 of a reversible rotary pump is keyed at 21 to the shaft 17. A liner 15' is disposed between the sleeve 15 and the rotor 20 and is held securely in place by the sleeve 15.

Within the rotor 20 I provide a cooperable pump gear 22 mounted on a stub shaft 23 preferably forming a part of the partition wall 11. The gear wheel 22 is eccentrically mounted with respect to the outer rotor 20, and between these two gear elements, I provide a moon-shaped filling element 24, which engages the teeth of the gear wheel 22 and the rotor 20 to fill the space therebetween.

The parts 20, 22, 23 and 24 comprise a pump B. The pump B which has been described has two passages 25 and 26 leading therefrom through the shell 15. Additional passages 27 and 29 through the shell 15 are equipped with check valves 30 and 31 which permit liquid to flow freely into the pump but prevent the discharge of liquid therethrough. These check valves are shown with pivot closure valve elements 32, but it should be understood that any desired type of check valve could be used which is of the proper size to permit a free flow of liquid into the pump when it is necessary.

Rotation of the shaft 17 acts to rotate the pump rotor 20 to drive liquid either toward the valve opening 25 or the valve opening 26. Let us say that in a forward direction the reversible pump rotor causes pressure at the valve in the valve opening 25. The valve opening 26 will then be positioned in the inlet to the pump so that the check valve 31 will permit liquid to flow into the casing to provide a source of fluid supply for the pump. The valve opening 25 is provided with a valve 33 which is equipped with a valve stem 34. A sleeve 35 encircles the valve stem 34 and a spring 36 is positioned between the end 37 of the sleeve 36 and the end of the valve stem 34. The cap end 37 of the sleeve 35 is drilled to provide an inlet or outlet for liquid so as to equalize pressure on both sides of the sleeve 35. This opening 39 may be of such a size as to dampen the movements of the sleeve 35 with respect to the stem 34.

A pair of links 40 are pivotally secured at 41 to the sleeve cap 37. These links 40 are pivotally connected at 42 to levers 43 which are pivoted at 44 to fixed supports 45. Governor weights 46 on the arms 43 act to pivot the levers 43 upon centrifugal movement of the casing and various elements, causing an inward pressure on the sleeve 35 to compress the spring 36 and to tend to force the valve 33 against its seat.

A valve 47 is positioned in the seat of opening 26 having a valve stem 49. This valve stem 49 is telescopically supported in a sleeve 50 having a cap end 51 pivotally secured at 52 to a pair of links 53. A spring 54 is positioned between the end 51 of the sleeve 50 and the valve stem 49 tending to urge the valve inwardly against its seat. An opening 55 is provided in the cap end 51 of the proper dimensions to dampen the movement of the sleeve 50 with respect to the stem 49.

The links 53 are pivotally connected at 56 to levers 57 which are pivotally supported at 59 to supports 60 secured to the sleeve 15. Governor weights 61 are provided on the ends of the levers 57 which are thrown outwardly by centrifugal force tending to compress the spring 54 and to urge the valve 47 against its seat 26. If the clutch is not to be of a reversible type, the second valve 47 and its associated mechanism is unnecessary.

Supports 62 are provided for the weights 46 to limit the inward movement thereof and to provide an initial tension on the spring 36. Similar supports 63 are provided on the casing to engage the governor weights 61 and to limit the inward movement thereof, thus providing an initial tension on the spring 54. Thus there is at all times a spring tension tending to urge the spring 54 inwardly.

An opening 65 is provided in the partition wall 11 through which liquid may escape from a space betwen the sleeves 15 and 10 to the reservoir 66 located between the partition wall 11 and the end closure 13 and extending to the full diameter of the clutch. A similar opening 67 is provided in the partition wall 11 leading to the chamber enclosing the oppositely disposed governor. The chamber shown between the sleeves 10 and 15 at the top of Figure 1 is separated from the chamber shown at the bottom of Figure 1 between these rings by means of webs 87, so that in order to get from one chamber to the other, it is necessary to pass through the openings 65 and 67, or through additional openings 69 and 70. A check valve 71 is provided over the opening 69 and a similar check valve 72 is provided for the opening 70. Thus on the inlet side of the pump, the check valve 71 or 72 may open to permit a free flow of liquid from the reservoir 66 into the chamber associated with the pump inlet and the check valve 30 or 31 may also open to provide an open passage into the pump chamber. A brake band 73 which may be dead-ended at one end 74 and which may be connected at its other end 75 to a bell crank lever 76, operated by a suitable operating rod 77, may encircle the outer ring or sleeve 10 of the casing and which may be used to hold the casing stationary when it is so desired.

As the shaft 17 rotates the reversible pump in one direction, liquid is drawn in through the passage 29, past the check valve 31, and liquid is drawn into the chamber illustrated at the bottom of Figure 1 through passages 67 and 70 from the reservoir 66. At the same time liquid under pressure is forced from the outlet end of the pump past the valve 33. It will be seen that the check valve 30 is closed at the outlet end of the pump so all fluid escaping from the pump must pass the valve 33. Some initial pressure against the valve 33 is provided by the spring 36, but this pressure is not too great to permit the valve 33 to open somewhat and to provide a slow circulation of liquid past the valve 33 out through the opening 65 into the reservoir 66 from which it is directed to the intake of the pump in the manner which has been previously described.

The back pressure of the spring 36 against the valve 33 is not sufficient to provide rotation of the casing when the motor driving the shaft 17 is travelling at idling speed. In other words, the natural resistance to movement of the vehicle containing the hydraulic clutch A is sufficient to hold the car stationary, while the force of the pump opens the valve 33 and causes circulation of liquid. Any tendency to rotate the driven member may be overcome by tightening brake band 73.

As the speed of rotation of the shaft 17 is increased, a greater pressure is urged against the valve 33, opening this valve to a greater extent and forcing more liquid therethrough. The size of the outlet 65 is so proportioned that a greater flow of liquid will cause sufficient back pressure to start rotation of the casing with the pump. In other words, the liquid expelled by the pump is in such a quantity that it cannot pass through the aperture 65 as quickly as it is expelled from the pump, thereby causing movement of the casing and the pump, the casing travelling at a speed which the passage of oil through the aperture 65 will be equal to the flow of oil from the pump into the chamber connected to the outlet and positioned between the concentric sleeves 10 and 15. In other words, there will be some slippage between the speed of rotation of the pump and the speed of rotation of the casing, the amount of this slippage being adjusted by the position of the valve 33 and the size of the outlet 65.

As the casing starts to rotate, the governor weights 46 and 61 pivot outwardly increasing the tension of the spring 36 against the valve 34, and thus tending to close this valve. Thus as the pressure of liquid leaving the pump increases, the pressure tending to close the valve 33 also increases. By proper proportioning of the parts, I have been able to so construct the clutch that when minimum speed is required by the driven shaft 79 fastened to the closure plate 13 by bolts 86, the valve 33 will tend to open but when additional torque is required for acceleration purposes or to meet increasing resistance, the valve 33 will remain partially open or will tend to close to prevent relative slipping between the pump rotor and the casing as the speed of the casing increases.

For example, when the pump rotor is travelling at a speed of for example 1000 R. P. M., the outward pressure created by the pump may be thirty-eight pounds, while the maximum outward pressure which can be developed by the pump in case of maximum torque or resistance may be forty-two pounds. The inward pressure on the valve 33 is then designed to be approximately forty pounds, so that the valve will remain closed when a maximum torque is required and as the casing slows down will open when a minimum torque is required.

It will be noted that my governor is so devised that an increase in speed of the driven casing will act not only to increase the centrifugal force by the increase of speed, but also the governor weights 46 or 61 will be swung outwardly so that they travel in a longer orbit, thus increasing the pressure tending to hold the valve closed.

When it is desired to reverse the rotation of the casing, the pump is reversed so that the passage 28 normally closed by the valve 47 forms the outlet, while the passage 25 and opening 27 form the inlet to the pump. The action is identical to that which has been described, the governor shown at the lower end of the figure taking the place of the governor shown at the top of the figure and regulating the flow of liquid from the pump casing.

I have found that if the valve and the various openings are properly proportioned, certain of the openings may be omitted from the construction. It is possible that the valve 33 or 47 may be properly proportioned to take over the function of the orifice 65 and this orifice 65 and the check valve 30 and its corresponding function may be eliminated.

It will be noted that when the shaft 17 is travelling at a low rate of speed, the liquid forced by the pump will not be sufficient to cause sufficient back pressure to overcome the inertia of the vehicle. However, an increase in speed of the shaft will cause a back pressure due to the restriction in size of the orifices 65 or 67 and rotation of the casing will occur. In case the speed is changed from forward to reverse, the brake band 73 may be used to stop the casing so that it may be quickly rotated in the opposite direction.

Obviously the specific position of the governor and the various parts is not important and the governor may be positioned either in the manner shown or in a direction at right angles thereto. Furthermore, the position of the various ports should not be important so long as the function of these ports is the same. The governor must be so proportioned that the weights on the weight arms will be overcome by the weight of the various other parts forming the governor so that the governor will act in the manner described. By changing the proportions of the levers 43 and changing the position of their mounting and by changing the angle at which these levers remain, it is possible to obtain virtually any desired action on the part of the governor so that the pressure tending to close the valve 33 or 47 will be intermediate the outward pressure against this valve when minimum and maximum torque is required. After the point of greatest maximum torque developed by the engine has been reached, the pressure tending to close the valve 33 or 47 will no longer remain intermediate the minimum and maximum torque pressures and the valve 33 or 47 will remain closed at speeds above the speed of greatest maximum torque development.

The clutch A may if desired be positioned between the ordinary transmission and the differential so that the conventional cars now being used may be equipped with a fluid drive at little cost. If the clutch A is so devised as to operate in one direction only, the clutch must be positioned between the engine and the transmission so as to provide a reversal of direction.

In accordance with the patent statutes, I have described the principles of construction and operation of my hydraulic governor; and while I have endeavored to set forth the best embodiment thereof, I desire to have it understood that this is only illustrative of a means of carrying out my invention and that obvious changes may be made within the scope of the following claims without departing from the spirit of my invention.

I claim:

1. A hydraulic clutch comprising a pair of concentric sleeves, closed ends thereon, a pump in the inner of said sleeves, a drive shaft for said pump extending through one of said closed ends, an inlet and an outlet to said pump through said inner sleeve, a pair of chambers between said sleeves, one of which is connected to said inlet and the other of which is connected to said outlet, a common reservoir connecting said chambers, a valve in said outlet, means in said casing operable by centrifugal force upon an increase in the speed of rotation of said casing to urge said valve toward closed position, and orifice means between said chambers and said reservoir of a size to restrict the flow of liquid between said chambers.

2. A hydraulic clutch comprising a pair of concentric sleeves, closed ends on said sleeves, a reversible pump within the inner of said sleeves, said inner sleeve having a pair of passages therethrough, a pair of chambers between said sleeves, a common reservoir connecting said chambers, one of which is connected to each of said passages, valves in said passages, means operable by an increase in rotary speed of said casing to urge said valves toward closed position, said inner sleeve having a second passage from each said chamber to said pump, check valves in each said second passage to permit liquid to flow therethrough in one direction only, and a restricted passage between said chambers and said reservoir.

3. A hydraulic clutch comprising a hollow cylindrical casing having closed ends, a partition wall between, and parallel to, said closed ends, an inner sleeve within said casing between said partition wall and one of said closed ends, a pump within said sleeve, a drive shaft through said one end to said pump, an inlet and an outlet to said pump through said sleeve, a pair of chambers between said sleeves, one of which is connected to said inlet and the the other of which is connected to said outlet, a valve in said outlet, means operable by an increase in the speed of rotation of said casing to urge said valve toward closed position, said partition wall having a restricted orifice therein between said chamber connected to said outlet and the space between said partition wall and said other closed end, and said partition wall having an opening therethrough between said chamber connected to said inlet and said space between said partition wall and said other closed end.

4. A hydraulic clutch comprising a hollow cylindrical casing having closed ends, a partition wall parallel to, and spaced between, said ends, an inner sleeve concentric with said casing extending between said partition wall and one of said closed ends, a reversible pump within said sleeve, a pump drive shaft extending through said one closed end, said sleeve including a pair of angularly spaced passages to said pump, either of which may act as the outlet while the other passage is closed, a pair of chambers between said casing and said sleeve, one of which is in communication with each passage, a reservoir in the space between said partition wall and the other of said closed ends, a valve in each said passage, means operable by an increase in the speed of rotation of said casing to actuate said valves to urge the same toward closed position, said partition wall having restricted orifices therethrough, one of said orifices communicating with each of said chambers, said partition wall having a pair of additional openings therethrough, check valves in said partition wall past which liquid may flow from said reservoir into either of said chambers, said sleeve having additional passages from each said chamber to said pump, and check valves in said additional passages past which liquid may flow toward said pump.

5. A hydraulic clutch comprising a hollow cylindrical casing having closed ends, a partition wall between, and parallel to, said closed ends, an inner sleeve within said casing between said partition wall and one of said closed ends, a pump within said sleeve, a drive shaft through said one end to said pump, an inlet and an outlet to said pump through said sleeve, a pair of chambers between said sleeves, one of which is connected to said inlet and the other of which is connected to said outlet, a valve in said outlet, means operable by an increase in the speed of rotation of said casing to urge said valve toward closed position, said partition wall having a restricted orifice therein between said chamber connected to said outlet and the space between said partition wall and said other closed end, said partition wall having an opening therethrough between said chamber connected to said inlet and said space between said partition wall and said other closed end, and a brake band encircling said casing to hold selectively said casing stationary.

WILLIAM A. ROTH.